United States Patent
Ou-Yang et al.

(10) Patent No.: US 10,726,147 B2
(45) Date of Patent: *Jul. 28, 2020

(54) FILE ENCRYPTION SUPPORT FOR FAT FILE SYSTEMS

(71) Applicant: Microsoft Technology Licensing, LLC., Redmond, WA (US)

(72) Inventors: Darwin Ou-Yang, Redmond, WA (US); Peter Novotney, Seattle, WA (US); Ravinder Thind, Sammamish, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/039,507

(22) Filed: Jul. 19, 2018

(65) Prior Publication Data

US 2019/0065768 A1    Feb. 28, 2019

Related U.S. Application Data

(63) Continuation of application No. 14/957,789, filed on Dec. 3, 2015, now Pat. No. 10,049,228.

(60) Provisional application No. 62/105,632, filed on Jan. 20, 2015, provisional application No. 62/171,708, filed on Jun. 5, 2015.

(51) Int. Cl.
*G06F 21/62* (2013.01)
*H04L 9/08* (2006.01)
*G06F 16/00* (2019.01)

(52) U.S. Cl.
CPC .......... *G06F 21/6218* (2013.01); *G06F 16/00* (2019.01); *G06F 21/6209* (2013.01); *H04L 9/0861* (2013.01)

(58) Field of Classification Search
CPC .. G06F 21/6218; G06F 16/00; G06F 21/6209; H04L 9/0861
See application file for complete search history.

(56) References Cited

U.S. PATENT DOCUMENTS

| 7,921,284 B1 * | 4/2011 | Kinghorn | G06F 21/6209 713/160 |
| 8,005,216 B1 * | 8/2011 | Agrawal | H04N 21/2347 380/200 |
| 8,006,280 B1 * | 8/2011 | Hildebrand | G06F 21/6218 380/277 |

(Continued)

FOREIGN PATENT DOCUMENTS

| CN | 1153461 C | 6/2004 |
| CN | 101669124 A | 3/2010 |

(Continued)

OTHER PUBLICATIONS

"First Office Action and Search Report Issued in Chinese Patent Application No. 201680006611.4", dated Jul. 26, 2019, 12 Pages.

(Continued)

*Primary Examiner* — Christopher A Revak
(74) *Attorney, Agent, or Firm* — BakerHostetler

(57) ABSTRACT

Native file encryption support is integrated into an existing file system that does not provide such support, such as the FAT family of file systems, while maintaining backwards compatibility with previous implementations of these file systems.

20 Claims, 4 Drawing Sheets

(56) References Cited

U.S. PATENT DOCUMENTS

| | | | | |
|---|---|---|---|---|
| 8,069,298 B2* | 11/2011 | Chang | ............... | G06F 21/10 |
| | | | | 711/100 |
| 8,909,881 B2* | 12/2014 | Bunte | ............... | G06F 11/1451 |
| | | | | 711/161 |
| 10,049,228 B2* | 8/2018 | Ou-Yang | ............. | G06F 21/6218 |
| 2005/0018842 A1* | 1/2005 | Fu | .................. | H04L 9/083 |
| | | | | 380/44 |
| 2009/0006796 A1* | 1/2009 | Chang | ............... | G06F 21/79 |
| | | | | 711/163 |
| 2010/0185854 A1* | 7/2010 | Burns | ............... | G06F 21/10 |
| | | | | 713/165 |
| 2012/0066493 A1* | 3/2012 | Widergren | ........ | G06F 21/10 |
| | | | | 713/160 |
| 2013/0042106 A1* | 2/2013 | Persaud | ............ | G06F 21/606 |
| | | | | 713/165 |
| 2013/0290731 A1* | 10/2013 | Branton | ............ | H04L 9/0863 |
| | | | | 713/189 |
| 2014/0089684 A1* | 3/2014 | Guo | .................. | G06F 21/6209 |
| | | | | 713/193 |
| 2018/0365434 A1* | 12/2018 | Ke | ..................... | H04L 9/0869 |
| 2019/0372766 A1* | 12/2019 | Bahrenburg | ...... | H04L 9/3213 |

FOREIGN PATENT DOCUMENTS

| | | |
|---|---|---|
| CN | 101803327 A | 8/2010 |
| CN | 103761487 A | 4/2014 |
| CN | 103825953 A | 5/2014 |

OTHER PUBLICATIONS

"Notice of Allowance Issued in Chinese Patent Application No. 201680006611.4", dated Mar. 26, 2020, 5 Pages.

* cited by examiner

FIG. 2

FILE ENCRYPTION SUPPORT FOR FAT FILE SYSTEMS

CROSS-REFERENCE TO RELATED APPLICATIONS

This application is a continuation of U.S. patent application Ser. No. 14/957,789, filed Dec. 3, 2015, which application claims benefit under 35 U.S.C. § 119(e) of U.S. Provisional Patent Application No. 62/105,632, filed Jan. 20, 2015, titled "Native File Encryption Support on FAT Family File Systems," and U.S. Provisional Patent Application No. 62/171,708, filed on Jun. 5, 2015, and titled "File Encryption Support for FAT File Systems," the contents of both of which are incorporated by reference herein in their entireties.

BACKGROUND

In computing, a file system is often a component of an operating system used for storing and organizing computer files and the data they contain to make it easy to find and access them. Some file systems, such as the New Technology File System (NTFS), provide native support for file-level encryption. File-level encryption support is provided within NTFS by an Encrypting File System (EFS) component. When a file is encrypted by EFS on NTFS, EFS creates a $EFS attribute for the file to store encryption metadata, such as certs, initialization vectors, file encryption keys, and the like, for the encrypted file.

SUMMARY

Aspects of the present disclosure enable native file encryption support to be integrated into an existing file system that does not provide such support, such as the FAT family of file systems, while maintaining backwards compatibility with previous implementations of these file systems. Aspects disclosed herein include ways for storing encryption metadata within the file system while preserving backwards compatibility, ways for manipulating file names so that older operating systems may still see and manipulate the files, and ways for manipulating file metadata so that previous implementations of a file system and their associated operating systems may still interpret the files and use the file system without corruption of data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings:

FIG. 2 is a diagram illustrating a series of directory entries for a file in a directory of a file system;

DETAILED DESCRIPTION OF ILLUSTRATIVE EMBODIMENTS

Unlike file systems that provide native support for file-level encryption, other file systems, such as the File Allocation Table (FAT) family of file systems, which includes the FAT32, FAT16, FAT12, and exFAT file systems, do not provide native support for file encryption. In those file systems, there is no native mechanism, such as an existing file stream or file property, for storing encryption metadata for an encrypted file.

The FAT family of file systems are often used on storage cards (SD) and other removable media. Encrypting the contents of an SD card or other removable media presently requires either reformatting of the entire storage medium with a file system that does support native encryption or use of an encryption tool, such as BitLocker. However, such tools often provide only volume-level encryption, not file-level encryption.

Aspects of the present disclosure enable native file encryption support to be integrated into an existing file system that does not provide such support, such as the FAT family of file systems, while maintaining backwards compatibility with previous implementations of these file systems. Aspects disclosed herein include ways for storing encryption metadata within the file system while preserving backwards compatibility, ways for manipulating file names so that older operating systems may still see and manipulate the files, and ways for manipulating file metadata so that previous implementations of a file system and their associated operating systems may still interpret the files and use the file system without corruption of data.

Figure 1:
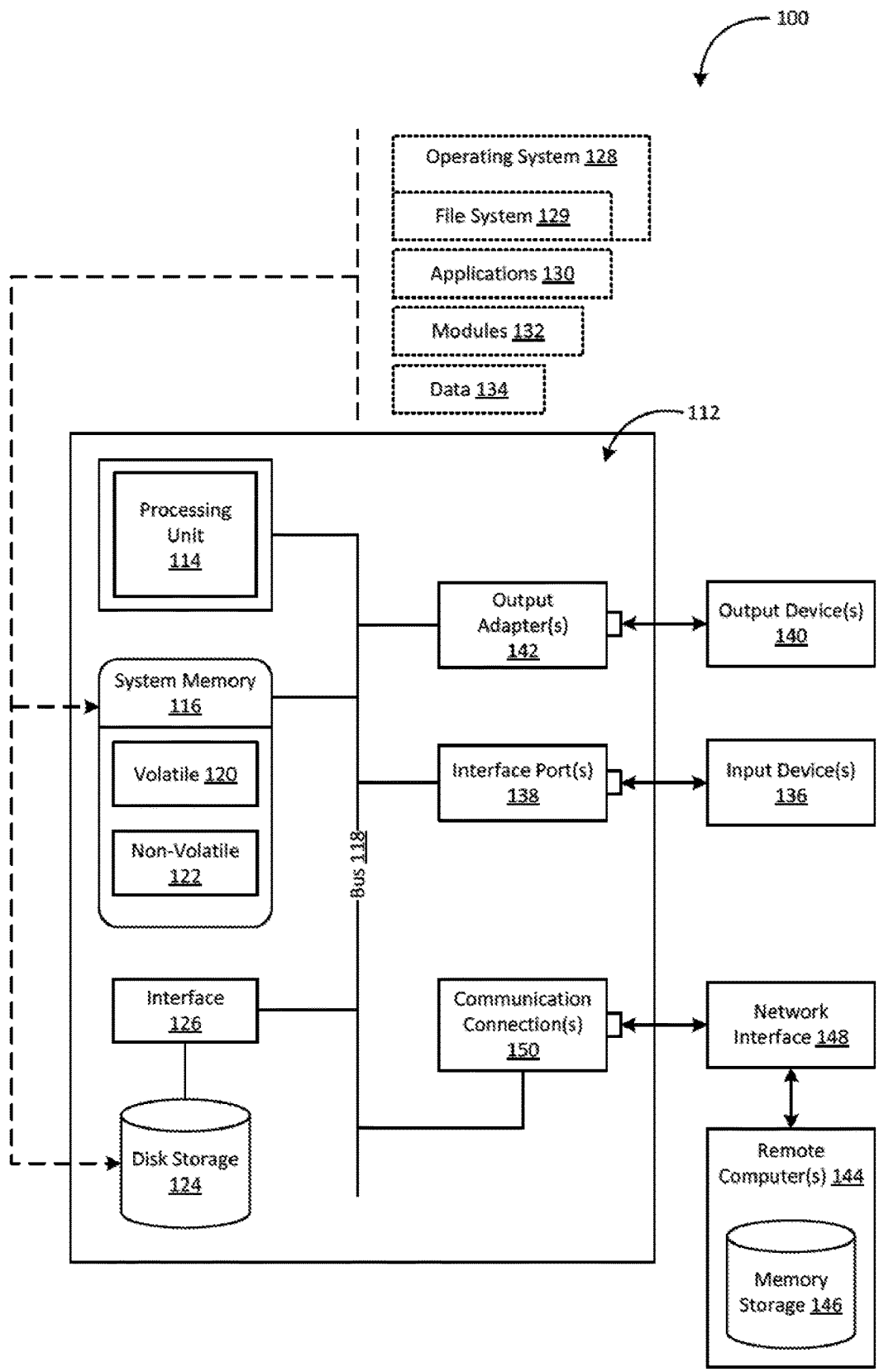
FIG. 1 illustrates an exemplary operating environment, in which the aspects disclosed herein may be employed.

FIG. 1 illustrates an exemplary environment 100 for implementing various aspects of the disclosure. As shown, environment 100 includes a computing device 112. The computing device 112 may be any one of a variety of different types of computing devices, including, but not limited to, a computer, personal computer, server, portable computer, mobile computer, wearable computer, laptop, tablet, personal digital assistant, smartphone, digital camera, or any other machine that performs computations automatically.

The computing device 112 includes a processing unit 114, a system memory 116, and a system bus 118. The system bus 118 couples system components including, but not limited to, the system memory 116 to the processing unit 114. The processing unit 114 may be any of various available processors. Dual microprocessors and other multiprocessor architectures also may be employed as the processing unit 114.

The system bus 118 may be any of several types of bus structure(s) including a memory bus or memory controller, a peripheral bus or external bus, and/or a local bus using any variety of available bus architectures including, but not limited to, Industry Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 116 includes volatile memory 120 and nonvolatile memory 122. The basic input/output system (BIOS), containing the basic routines to transfer information between elements within the computing device 112, such as during start-up, is stored in nonvolatile memory 122. By way of illustration, and not limitation, nonvolatile memory 122 may include read only memory (ROM), programmable ROM (PROM), electrically programmable ROM (EPROM), electrically erasable ROM (EEPROM), or flash memory. Volatile memory 120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computing device 112 also includes removable/non-removable, volatile/non-volatile computer-readable storage media. FIG. 1 illustrates, for example, a disk storage 124. Disk storage 124 includes, but is not limited to, devices like a magnetic disk drive, floppy disk drive, tape drive, Jaz drive, Zip drive, LS-100 drive, memory card (such as an SD memory card), or memory stick. In addition, disk storage 124 may include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 124 to the system bus 118, a removable or non-removable interface is typically used such as interface 126.

FIG. 1 further depicts software that acts as an intermediary between users and the basic computer resources described in the suitable operating environment 100. Such software includes an operating system 128. Operating system 128, which may be stored on disk storage 124, acts to control and allocate resources of the computing device 112. Applications 130 take advantage of the management of resources by operating system 128 through program modules 132 and program data 134 stored either in system memory 116 or on disk storage 124. It is to be appreciated that the aspects described herein may be implemented with various operating systems or combinations of operating systems. As further shown, the operating system 128 includes a file system 129 for storing and organizing, on the disk storage 124, computer files and the data they contain to make it easy to find and access them.

A user may enter commands or information into the computing device 112 through input device(s) 136. Input devices 136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 114 through the system bus 118 via interface port(s) 138. Interface port(s) 138 include, for example, a serial port, a parallel port, a game port, and a universal serial bus (USB). Output device(s) 140 use some of the same type of ports as input device(s) 136. Thus, for example, a USB port may be used to provide input to computing device 112, and to output information from computing device 112 to an output device 140. Output adapter 142 is provided to illustrate that there are some output devices 140 like monitors, speakers, and printers, among other output devices 140, which require special adapters. The output adapters 142 include, by way of illustration and not limitation, video and sound cards that provide a means of connection between the output device 140 and the system bus 118. It should be noted that other devices and/or systems of devices provide both input and output capabilities such as remote computer(s) 144.

Computing device 112 may operate in a networked environment using logical connections to one or more remote computing devices, such as remote computing device(s) 144. The remote computing device(s) 144 may be a personal computer, a server, a router, a network PC, a workstation, a microprocessor based appliance, a peer device, another computing device identical to the computing device 112, or the like, and typically includes many or all of the elements described relative to computing device 112. For purposes of brevity, only a memory storage device 146 is illustrated with remote computing device(s) 144. Remote computing device(s) 144 is logically connected to computing device 112 through a network interface 148 and then physically connected via communication connection 150. Network interface 148 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 150 refers to the hardware/software employed to connect the network interface 148 to the bus 118. While communication connection 150 is shown for illustrative clarity inside computing device 112, it may also be external to computing device 112. The hardware/software necessary for connection to the network interface 148 includes, for exemplary purposes only, internal and external technologies such as modems including regular telephone grade modems, cable modems and DSL modems, ISDN adapters, and Ethernet cards.

As used herein, the terms "component," "system," "module," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers. Note that for data structures illustrated herein, all fields are described as little endian.

As also used herein, the term "down-level file system" means a previous implementation of a file system that does not include the improvements described herein. Conversely, an "up-level file system" refers to a file system implementation that does include the improvements described herein.

As mentioned above, many file systems, such as the FAT family of file systems, which includes the FAT32, FAT16, FAT12, and exFAT file systems, do not provide native support for file encryption. The FAT family of file systems are often used on memory cards, such as SD cards, and other removable media. The vast majority of portable computing device users, such as tablet, smartphone, and digital camera users, are expected to use memory cards in the future to store applications and personal files. In order to provide privacy for user files and intellectual property protection for applications, encryption will be needed. However, because most memory cards use a file system that does not support native encryption, encrypting the contents of a memory card or other removable media presently requires either reformatting of the entire storage medium with a file system that does support native encryption (such as NTFS) or use of an encryption tool, such as BitLocker. However, reformatting is not a user-friendly process, and tools such as BitLocker often provide only volume-level encryption, not file-level encryption.

Addressing these problems, aspects of the present disclosure enable native file encryption support to be integrated into an existing file system that does not provide such support, such as the FAT family of file systems, while maintaining backwards compatibility with previous implementations of these file systems (i.e., down-level file systems).

The embodiments described hereinafter are described in the context of certain FAT file system, in particular the FAT32 file system and exFAT file system. However, it is understood that the aspects described herein may be applied to any file system that employs a directory of directory entries to provide information about files stored on a storage medium, but which does not presently provide native support for file-level encryption. Thus, the claimed subject matter is by no means limited to the FAT family of file systems, and the discussion of FAT32, exFAT or any other FAT file system is by way of example only.

FAT32

Figure 2:
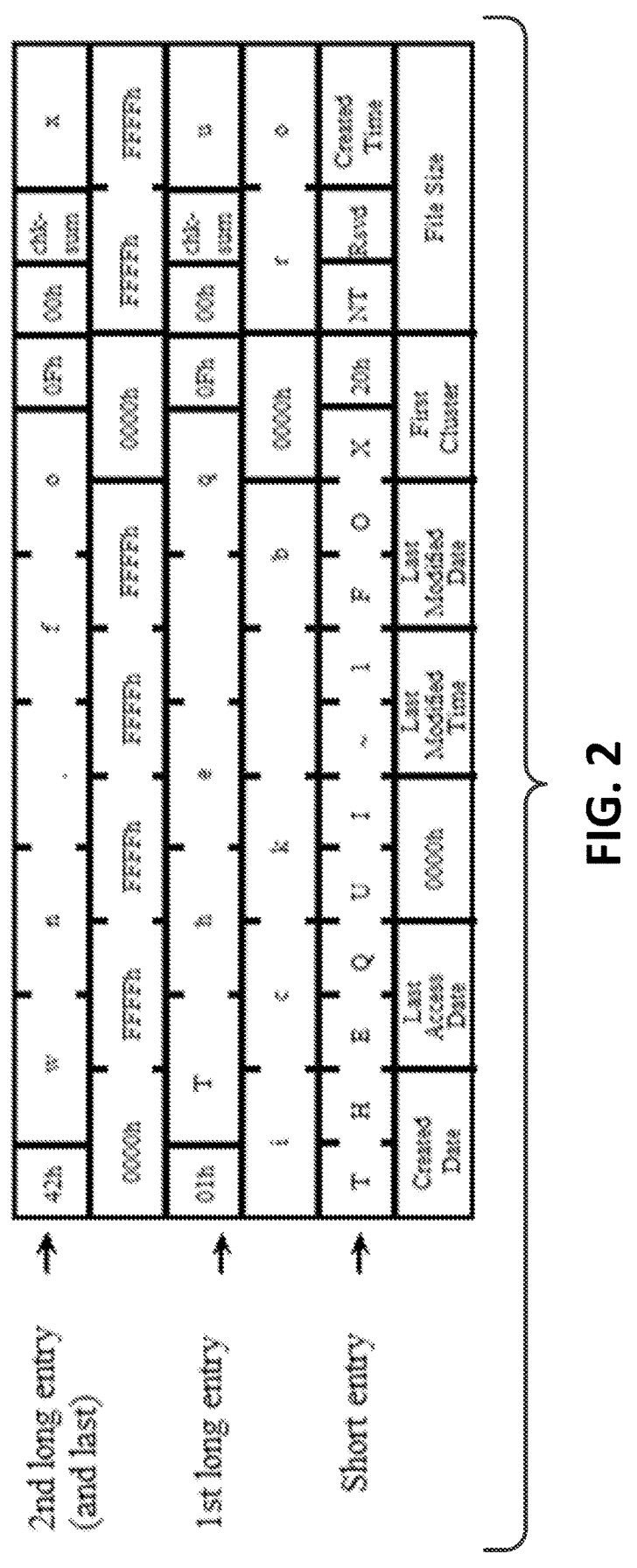

By way of further background, a directory on a FAT32 formatted storage volume comprises a linear table of 32-byte directory entries. Each file on FAT32 is represented with a series of 32 byte directory entries, such as the series of directory entries shown in the example of FIG. 2 for a file having the file name "The quick brown.fox". As shown, the series of directory entries includes a short entry that stores a shortened form of the file name in the 8.3 character format, as well as additional information about the file including its created time, created date, last access date, last modified time, and last modified date. In addition, the short entry includes an identification of the first cluster on disk containing the file contents and the file size. The short entry is followed in the file directory by one or more long entries that are used to capture the full, long file name for the file.

Further details of the format of the short entry are expressed in the following data structure definition:

```
typedef struct _PACKED_DIRENT {
    FAT8DOT3        FileName;              // offset = 0
    UCHAR           Attributes;            // offset = 11
    UCHAR           NtByte;                // offset = 12
    UCHAR           CreationMSec;          // offset = 13
    FAT_TIME_STAMP  CreationTime;          // offset = 14
    FAT_DATE        LastAccessDate;        // offset = 18
    union {
        USHORT      ExtendedAttributes;    // offset = 20
        USHORT      FirstClusterOfFileHi;  // offset = 20
    };
    FAT_TIME_STAMP  LastWriteTime;         // offset = 22
    USHORT          FirstClusterOfFile;    // offset = 26
    ULONG32         FileSize;              // offset = 28
} PACKED_DIRENT;
```

None of the fields of the short entry are defined to hold any form of encryption metadata. Note that the field named "NtByte" is defined in the FAT file system as a field of eight bits, two of which are used and six of which are defined as "reserved, ignore but preserve the value." Thus, existing FAT file system implementations effectively ignore the reserved bits of this field, but preserve their value. Of the two bits that are defined, one bit defines whether or not the 8 character part of the short file name is all lower case, and the other bit defines if the 3 character extension part of the short file name is all lower case.

Figure 3:
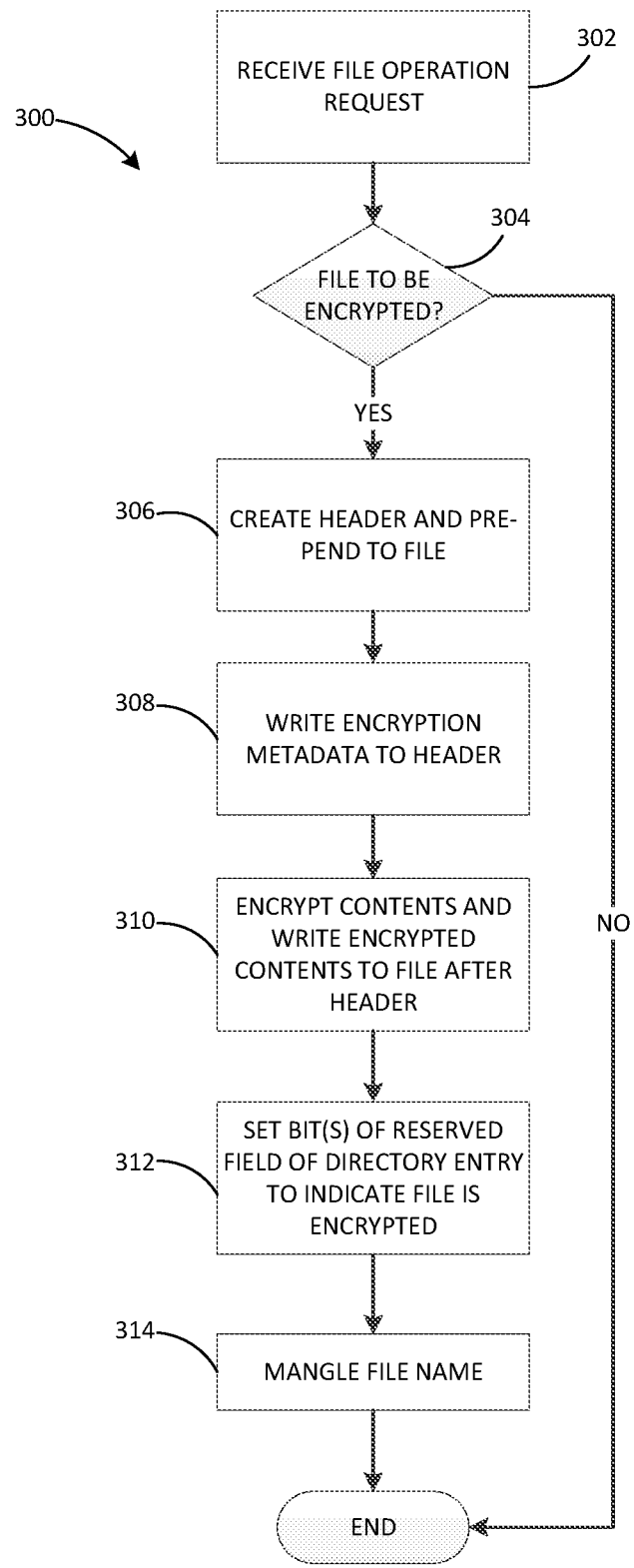
FIG. 3 is a flow diagram illustrating one embodiment of a method for integrating native encryption support into a file system while maintaining backwards compatibility with previous implementations of the file system.

FIG. 3 is a flow diagram illustrating one embodiment of a method 300 for integrating native encryption support into a file system while maintaining backwards compatibility with previous implementations of the file system. As shown, the method begins at step 302, where the file system receives a request to perform a file operation. For example, the request may be a request to create a file, to save a file, or to perform some other operation on the file. In step 304, the request is processed to determine whether it includes a request to encrypt the contents of the file. Such a request may be indicated by one or more parameters, flags, arguments, variables, or the like associated with the request or may be indicated by the particular form of request itself. If a request for encryption is not indicated, the remaining steps of FIG. 3 are not performed and the file system processes the file operation request in its conventional manner. If, however, a request for encryption of the file is indicated in step 304, then control passes to step 306. Note that while steps 306 through 314 are illustrated in FIG. 3 and described below in a particular order, the method is not limited to the particular order of steps shown.

In step 306, a file header is prepended to the file. That is, the file header will be written ahead of the file contents in the on-disk representation of the file. In one embodiment, the minimum size of the prepended header may be the sector size of the storage medium, or it may be a media-specific size (e.g., 64 k on flash media, 4 k or 512 bytes for hard drives, or integral multiples thereof). This may aid performance (sector size may not be media-specific performant). In one embodiment, in which the sector size of the storage medium on which the file will be written is 4 KB, this header may be a minimum of 4 KB in order to make sure all file accesses to the body of the file remain aligned to the sector size. This may eliminate the need to double-buffer non-cached input/output (I/O) and preserve performance. In an embodiment, the header may grow or shrink beyond the initial minimum size (e.g., 4 KB) by prepending or removing whole clusters from the beginning of the file. The contents of the header may include any encryption metadata necessary for the encrypted file contents to be decrypted and otherwise managed by the file system. For example, the encryption metadata in the header may include encryption keys used to encrypt the file, policies around the file's use, certs, initialization vectors, or the like. Note that the "prepending" is a logical prepending. In the list of file extents, the file header data will come first. On the media, the header may be at any location, i.e., logical block address (LBA).

In one embodiment, the header will default to 4 KB in size if created when the file has zero file length. It may grow by prepending clusters to the front of the file, and relocating the header back to the beginning of the file's allocation. If the file already has content in it, the header creation may default to one cluster in size, with a minimum size of 4 KB, prepended to the file. If the header needs to grow, the FAT file system will allocate a new cluster, insert it into the file, and then relocate the header contents to match.

In one embodiment, the header may be treated like a separate piece of file system metadata, and the up-level FAT file system may hide it from any normal I/O Request Packets (IRP) that may be sent down to the FAT driver. The header may be exposed as an attribute through the NtOfs API set, of which the up-level FAT implementation may provide a minimal implementation.

In one embodiment, the header may be formatted in accordance with a pfile format, which is a standard header format for encrypted files created by Rights Management Services (RMS) available from Microsoft Corporation. In other embodiments, other formats may be used. For example, the traditional $EFS-style encryption header of the EFS file system may be used.

In step 308, the encryption metadata for the file is written to the prepended header.

In step 310, the contents of the file are encrypted in accordance with the received request. In various embodiments, the file contents may be encrypted with any one of a variety of cryptographic algorithms, such as Advanced Encryption Standard (AES), Data Encryption Standard (DES), Twofish, Serpent, Blowfish, CAST5, RC4, Triple DES, and the like. Once encrypted, the encrypted contents may be written to disk following the prepended header containing the encryption metadata. Again, note that the location of the encrypted file following the prepended header refers to the file-system level logical layout as described by file extents, not physical or LBA addresses. In the normal file directory entry for the file to be used by down-level file system implementations, such as the short entry illustrated in FIG. 2, the first cluster field of the entry will identify the start of the prepended header and the file size will indicate the full size of the encrypted file including its header and any padding (as discussed below).

In step 312, in this embodiment, the file system may indicate in a reserved (i.e., undefined) field of a file directory entry for the file that the file is encrypted. In one embodiment, in which the method is implemented in a FAT32 file system, the file system uses a bit of the NtByte field of a short directory entry for the file to indicate that the file is encrypted. The NtByte field of a FAT32 short directory entry has six (6) bits that are reserved (i.e., undefined) and which may be used for this purpose. In this embodiment, one bit may be set (e.g., value="1") to indicate "the file is encrypted." In addition, in one embodiment, a second bit may be set to indicate that the prepended header is a standard size (e.g., 4 KB). If the header is not the standard size, then the header must be read to determine its size.

In some embodiments, the encryption algorithm may require padding bytes. For example, in one embodiment, the encryption algorithm employed to encrypt the file contents may be the AES Chained Block Cipher (AES-CBC) algorithm with 16-byte blocks. This requires all file sizes to be rounded up to the nearest 16-byte AES block, otherwise the last piece of the file will not decrypt properly. In order to enable down-level files system implementations to read the entire last block of a file, the file length on disk is padded up to the next block alignment—in the case of AES-CBC, the file is padded up to a 16 byte alignment, so up to 15 padding bytes may be required. As a consequence, the up-level implementation needs to store or compute the true length from the padded length of the file when the file is opened or enumerated on the up-level implementation. In the present embodiment, additional bits of the reserved field of an existing file directory entry may be used to store the number of padding bytes added to the file size, or alternatively indicate the number of non-padding bytes in the last block. In most cases, up to $2^N-1$ padding bytes may be efficiently cached by the use of N previously reserved bits. In an embodiment in which the method of FIG. 3 is integrated into the FAT32 file system and AES-CBC encryption is employed, the four (4) remaining reserved (i.e., undefined) bits of the NtByte field of the FAT short directory entry may be used to store the number of padding bytes of the last 16-byte block of the file (that is, N=4). In order for the up-level file system to present the file to the user, the true size of the file may be computed by taking the file size of the entire file, subtracting the size of the header, and then subtracting the number of padding bytes. In another embodiment, the true file size or file size delta may also be persisted in the file header so that this information is retained for redundancy or if multiple copies of the file are made. This redundancy may also aid in recovery should the NtByte field be cleared by a down level file system implementation.

In the embodiment in which AES-CBC encryption with 16-byte blocks is employed, Initialization Vectors (IV) may be set every 512 bytes. In one embodiment, IV is computed as the byte offset of the 512 byte section within the file encrypted with AES with the content key as the encryption key; the resulting 16-byte block is used as IV.

In step 314, the filename of the encrypted file is mangled (i.e., modified) to help indicate to the up-level file system that the file is encrypted and to enable the encrypted file to be visible to a down-level file system so that a user or application may employ a user mode tool to decrypt the file if desired. For example, in one embodiment, on-disk, an additional extension (e.g., ".pfile") may be appended to the file name. For example, for a file with a file name of "The quick brown.fox," a down-level implementation of the file system will see the name "The quick brown.fox.pfile". A user mode tool associated with the ".pfile" extension may then be able to open and decrypt any such files when supplied with the correct decryption key. On the up-level implementation of the file system that employs the method of FIG. 3, the file system may hide the ".pfile" extension on any files that are to be treated as native encrypted files, so the user does not need to worry about using a tool to open them, and may open the files directly with any application using the native decryption algorithm within the file system.

With the additional file name extension (e.g., ".pfile"), in some embodiments, an up-level file system may perform one or more additional file system behaviors as follows. First, when a file is created, if it has a .pfile extension, the creation may be failed. Second, when a file is created, the file system may check for the existence of both name.doc and name.doc.pfile. If either exists already, the creation may fail, for example with an already exists error. Third, when a file is opened, if the file specified ends in .pfile and is not marked encrypted, the open may be failed. Fourth, when a file is opened, the file system may check for both name.doc and name.doc.pfile and open either one. If they both exist, it may open the first one it encounters. Fifth, when a file is renamed, the file system may check for both name.doc and name.doc.pfile in the target directory and may fail the rename if either name exists. Sixth, when a file is enumerated, if it has a .pfile extension, that extension may be hidden, unless a .pfile version of it has already been encountered in the directory.

Once the encrypted file has been stored to disk in accordance with the method of FIG. 3, when a file access operation (e.g., a request to "open" the file) is received by the up-level file system, the file system may determine from the bits set in the reserved field that the file is encrypted, may strip off the additional extension (e.g., ".pfile") from the filename, and may obtain the necessary encryption metadata from the file header to decrypt the file for access by a user—natively within the file system. Also, the modified file size may be efficiently shown to the user without reading the prepended encryption metadata header, by the use of the N bits indicating how much is padding. A down-level file system implementation will ignore the reserved bits and simply see a file having a ".pfile" extension, thus maintaining backwards compatibility. A user mode application or tool, such as IRM Reader, could then be used to decrypt the file if desired. This requires that the file size on disk—as reflected in the conventional file directory entries for the file—must reflect the encrypted size including the header and any padding to the encryption block size (e.g., padding to the AES block size).

In one embodiment, the up-level file system may handle a situation in which a file is encountered—for example, during the listing of a directory or other access that requires file size—where the file name has the added extension to indicate encryption (e.g., ".pfile") but the encrypted bit in the reserved bits of its file directory entry (e.g., NtByte field in the short entry of a FAT directory) is not set to indicate the file is encrypted. Upon detecting this situation, the file system may read at least some file contents to determine if the beginning validates as a prepended header of the type disclosed herein. If that file content validates as a prepended header, the file system may determine the true file size without padding from the prepended header contents, and may further do any combination of (a) keep cached results in memory to improve future efficiency for this directory entry, (b) if the storage media is writable, update the encrypted bit and padding bytes value in the directory entry to make future listing of the file system more efficient, and (c) hide the additional extension (e.g., ".pfile") and report the "true" size of the unencrypted data. If, on the other hand, the content of the file does not validate as an encrypted file, the file system may report the file size and file name as it is expressed in the directory entry (e.g., FAT short entry) for the file. In other embodiments, this process may not be implemented as part of the file system, but instead as another system component which performs the validation of the prepended header before commanding the file system to set the encrypted bit. In other words, instead of the file system automatically enabling the encrypted bit and validating the prepended header on enumerate, that process is instead performed on-demand when the user instructs the file system to do so, for example using a user mode process, such as a shell extension, utility, or the like.

Figure 4:
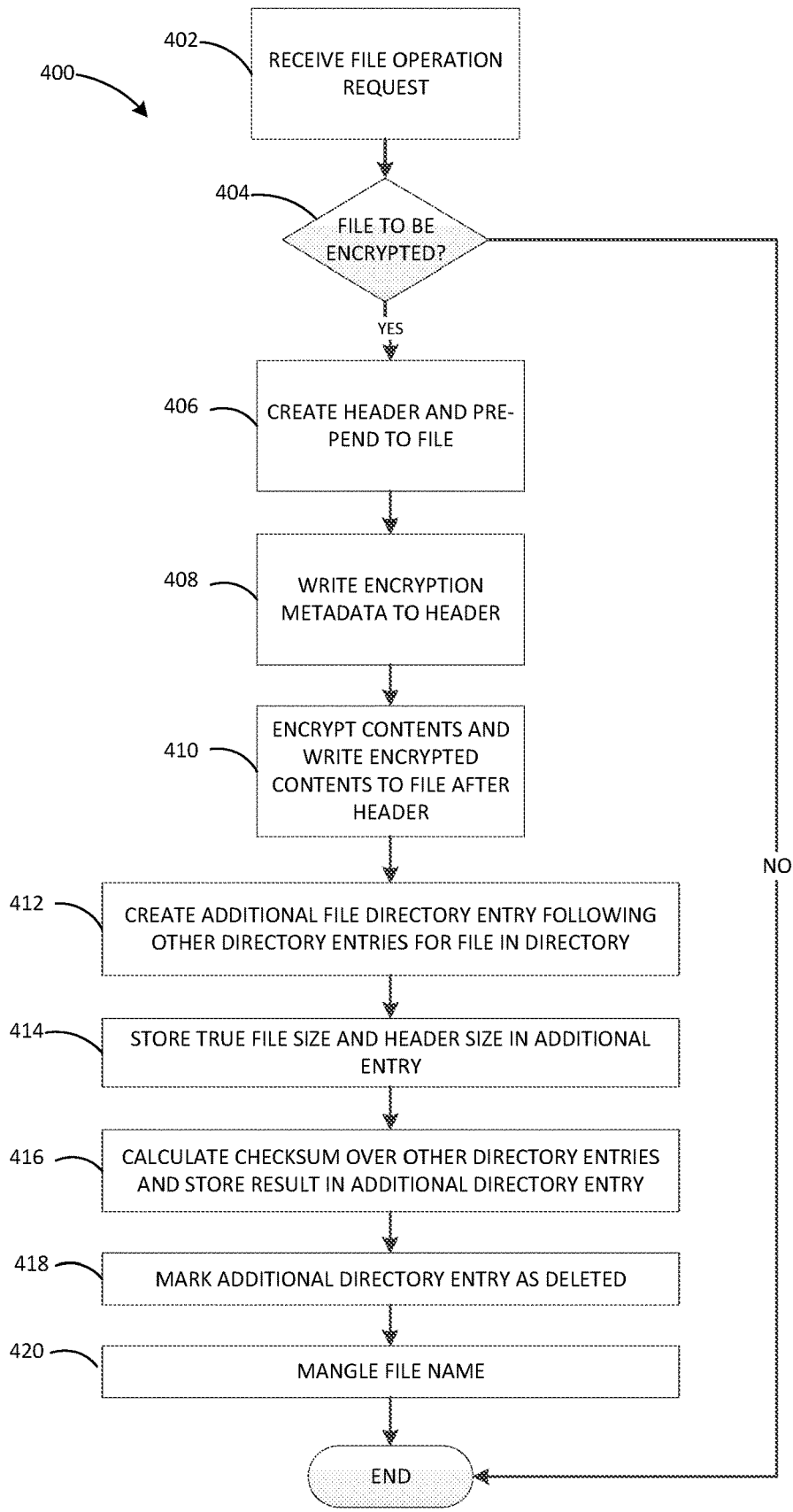
FIG. 4 is a flow diagram illustrating another embodiment of a method for integrating native encryption support into a file system while maintaining backwards compatibility with previous implementations of the file system.

FIG. 4 is a flow diagram illustrating another embodiment of a method for integrating native encryption support into a file system while maintaining backwards compatibility with previous implementations of the file system. In this embodiment, steps 402 through 410 are essentially the same as steps 302 through 310 of FIG. 3. When it is determined in step 404 that the file is to be encrypted, a header is prepended to the on-disk representation of the file (step 406), the encryption metadata is written to the header (step 408), and the encrypted file contents are written to disk after the prepended header (step 410). As discussed above in connection with FIG. 3, the contents of the file may need to be padded to align with the next encryption block boundary. But in this embodiment, instead of using a reserved field of a conventional file directory entry to indicate that the file is encrypted, in step 412 an additional directory entry is created in the file directory after the conventional file directory entries have been created (e.g., after the conventional directory entries illustrated by example in FIG. 2).

In step 414, the true file size (e.g., minus any padding) and the size of the header may be stored directly in this additional, trailing directory entry.

In step 416, the file system may perform a cryptographic operation over at least a portion of the prior, conventional directory entries of the file and store the result in the additional, trailing directory entry to provide a means for the up-level file system to validate that the new, trailing directory entry is associated with the conventional directory entries. In one embodiment, the cryptographic operation comprises calculating a checksum over the prior, conventional directory entries of the file.

In one embodiment, the additional, trailing directory entry may have the following format:

```
typedef struct _PACKED_DIRENT {
    UCHAR       UnusedMark;                  // offset = 0
    UCHAR       Type;                        // offset = 1
    UCHAR       Reserved[2];                 // offset = 2
    ULONG       AssociatedDirentsChecksum;   // offset = 4
    ULONG       EfsHeaderSize;               // offset = 8
    ULONG       FileSize;                    // offset = 12
    UCHAR       Reserved[12];                // offset = 16
    ULONG       Checksum;                    // offset = 28
}PACKED_DIRENT;                              // sizeof = 32
typedef PACKED_DIRENT *PPACKED_DIRENT;
```

The first entry of the directory entry, UnusedMark, marks it as an unused FAT32 directory entry. As described in the next step, this field may be set to 0xE5 indicating that the director entry is a deleted entry. The Type field is set to 0x1, which may be defined to be encryption metadata. The next two bytes are reserved for future use. The following field, AssociatedDirentsChecksum, is a CRC32 of the preceding set of conventional FAT directory entries for the file. The next two ULONGs store the header size and true file size of the encrypted file directly. The Reserved[12] field is also unused, for future expansion. Finally, the Checksum field is a CRC32 of this additional directory entry itself. This is used to help validate this is a real trailing directory entry, and not junk. Note that the true size of the file or the difference between the true size and the actual file size may also be stored in the prepended header itself for redundancy. This redundancy may aid in recovery should the additional, trailing directory entry be cleared or deleted by a down level file system implementation.

In step 418, the new, trailing directory entry may be marked as a deleted directory entry. For example, in the embodiment illustrated above, the first byte of the directory entry may be set to the hex value "0xE5". Because this additional, trailing directory entry is marked as unused or deleted, on a down-level file system implementation, it will be ignored. Note that if the metadata in the conventional file directory entries of the file is altered, the checksum will be invalidated. In this case, the up-level file system implementation may detect this invalidation and regenerate the new, trailing directory entry including its checksum. This is also a hint to the up-level implementation of FAT to recompute the header size and true file length from the header information of the file.

Step 420 is essentially identical to step 314 of FIG. 3, in which the filename of the encrypted file is mangled (i.e., modified) to help indicate to the up-level file system that the file is encrypted and to enable the encrypted file to be visible to a down-level file system so that a user or application may employ a user mode tool to decrypt the file if desired. For example, in one embodiment, on-disk, an additional extension (e.g., ".pfile") may be appended to the file name.

An advantage of this embodiment is that the true file length and header length may be cached in the directory itself, rather than forcing the file system implementation to open each file and read this information from the header every time. Note that the use of the 4 reserved bits of the NtByte field of a short directory entry—as discussed above in connection with the embodiment of FIG. 3—may also gain this same efficiency.

Note that the method described herein and illustrated in FIG. 4 may be generalized to cache any sort of file system metadata information in the directory, while having unaware down-level implementations invalidate the cache without prior knowledge of the structure of this information.

The foregoing methods for integrating native file encryption on an existing file system, such as a FAT family file system, enables native file encryption to be provided in a backwards compatible and performant manner so as to be usable for consumer file encryption, AppX application package files and appdata, as well as enterprise scenarios like remote wipe and work folders.

In an embodiment, an up-level file system may also move an encrypted file from one directory (e.g., Directory A) to another directory (e.g., Directory B). In one embodiment, in order to effect such a move, the file system allocates new directory entries in the target location (e.g., Directory B). The file system then reads the contents of the directory entries from the old location (e.g., Directory A), and writes the contents to the directory entries of the target location. The old directory entries may then be marked as unused. In the embodiment of FIG. 3, because the reserved bits (e.g. NtByte field) of the old directory entry are copied, the file retains its encrypted nature.

Movement of a file from one directory to another is also possible in a down-level file system. In one embodiment, such a move comprises the file system allocating new directory entries in the target location, reading the contents from the directory entries in the old location, writing the contents to the directory entries allocated in the target location, and then marking the old directory entries as unused. Again, since the NtByte is reserved, but the contents are defined as "preserve but ignore," the file retains its encrypted nature.

Converting an encrypted file to a non-encrypted file may also be performed. In one embodiment, this capability may not be supported directly by the file system, but instead performed at a higher level by the encryption service creating a new unencrypted file, then copying all the data across, and then renaming the new file back to the old name.

Conversely, converting a non-encrypted file to an encrypted file may also be performed. Again, in one embodiment, this may not be supported directly by the file system, but instead performed at a higher level by the encryption service creating a new encrypted file, then copying all the data across, and then renaming the new file back to the old name.

In one embodiment, the method of FIG. 3 or FIG. 4 may be integrated into the FAT32 file system using a static library model, in which the integration points for the method are directly added into the FAT file system. In this embodiment, the fastfat.sys binary may be linked with the static library. The layering and build may be identical to that for NTFS; the static library may be published cross depot and consumed by the FAT file system. While the program code to implement the integration may be processor agnostic, the cryptographic libraries that the implementation calls to perform the file encryption may be optimized per platform.

exFAT

As mentioned above, the methods described herein and illustrated in FIGS. 3 and 4 may also be embodied in an exFAT file system implementation. By way of further background, a directory on an exFAT volume comprises a linear table of 32-byte directory entries, similar to FAT32. A file on an exFAT volume is represented with a sequence of at least three 32-byte directory entries. The first is a FILE directory entry, representing the file itself. The second is a STREAM directory entry, representing the data in the file, and the third and subsequent directory entries are NAME directory entries, representing the name of the file.

The methods illustrated in FIGS. 3 and 4 and described above may be implemented in an exFAT file system in essentially the same manner as described above with respect to a FAT32 implementation, except for (1) the directory entry location of the bit (i.e., flag) to indicate that "the file is encrypted," (2) the directory entry location of information identifying the number of padding bytes of the last 16-byte block of the file, and (3) the provision in, and location of, information in a directory entry specifying the length of the prepended file header length.

In one embodiment in an exFAT file system implementation, a previously reserved bit (e.g., bit 0x8000) of a Reserved® field of an exFAT FILE directory entry is used to indicate that "the file is encrypted" in the manner described herein. The following describes the format of an exFAT FILE directory entry, including the newly defined "the file is encrypted" bit:

```
typedef struct _FPP_FILE_RECORD {
    //
    // Type will have the value 'Dirent' (0x85)
    //
    FPP_RECORD_HEADER Type;
    //
    // The count of secondary entries that follow this entry. There must be
    // at least one for 'FileName' (0xC0).
    //
    UCHAR SecondaryEntries;
    //
    // A checksum computed over the primary and all secondary entries.
    //
    USHORT Checksum;
    //
    // Standard file attributes.
    //
    USHORT Attributes;
    //
```

```
// Reserved for future expansion.
//
USHORT Reserved0;    (bit 0x8000 of this entry is defined to mean that the file
                     is encrypted; previously, this was a reserved bit)
//
// The following eight fields record when and where the file was created
// and written.
//
FAT_TIME_STAMP CreationTime;
FAT_TIME_STAMP LastWriteTime;
FAT_TIME_STAMP LastAccessTime;
UCHAR CreationTimeMsec;
UCHAR LastWriteTimeMsec;
FAT_TIME_ZONE CreationTimeZone;
FAT_TIME-ZONE LastWriteTimeZone;
FAT_TIME_ZONE LastAccessTimeZone;
UCHAR Reserved1[7];
} FPP_FILE_RECORD, *PFPP_FILE_RECORD;
```

In other embodiments, a different previously reserved bit may be used to indicate that "the file is encrypted."

Further in accordance with an embodiment in an exFAT file system implementation, a new EfsTailByteCount field is defined in a previously reserved field of the exFAT STREAM directory entry format to store the number of padding bytes of the last 16-byte block of the file, and an EfsHeaderLength field is defined in another previously reserved field of the exFAT STREAM directory entry to store an indication of the length of the prepended file header. The following describes the modified format of the exFAT STREAM directory entry, in accordance with one embodiment:

```
typedef struct _FPP_STREAM_RECORD {
//
// Type will have the value 'Stream' (0xC0)
//
FPP_RECORD_HEADER Type;
UCHAR AllocationFlags;
//
// EfsTailByteCount. This is the number of bytes after the EOF
// in the last AES crypto block, i.e., the number of padding bytes
// of the last
// 16-byte block of the file. For AES this is usually a
// number between 0 and 15. Future crypto algorithms may
// have larger block sizes.
//
UCHAR EfsTailByteCount; (formerly a reserved field)
//
// A count of characters in the file name, spanning the subsequent
// FPP_NAME_RECORD records that must immediately follow
this record.
//
UCHAR CharCount;
//
// This field is a hash of the full upcased name. This allows a much
// faster compare when checking for a file name collision.
//
USHORT UpcasedNameHash;
//
// EfsHeaderLength. This is the length of the header that is prepended to
// the beginning of the file as described above and illustrated in FIG. 3,
// in terms of 4096 byte blocks. 4096 bytes = 1 block.
// The maximum size of the header is 256 KB, which is 64 blocks.
//
UCHAR EfsHeaderLength; (formerly a reserved field)
UCHAR Reserved2;
LONGLONG ValidDataLength;
ULONG Reserved3;
//
// Define where the file data lives.
//
FAT_ENTRY FirstClusterOfFile;
```

```
LONGLONG FileSize;
} FPP_STREAM_RECORD, *PFPP_STREAM_RECORD;
```

Note that the EfsTailByteCount field in the STREAM record may consist of a byte (i.e., 8 bits) in this embodiment, instead of the 4 bits defined in the FAT32 implementation, allowing block sizes up to 256 bytes to be accommodated. Note further that in the present embodiment, no changes are made to the exFAT NAME directory entry format. And as mentioned above, with the exception of the changes noted above to the exFAT FILE and STREAM directory entry formats, the methods described above and illustrated in FIGS. 3 and 4 may operate in essentially the same way in an exFAT file system implementation.

The illustrations of the aspects described herein are intended to provide a general understanding of the structure of the various aspects. The illustrations are not intended to serve as a complete description of all of the elements and features of apparatus and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive.

The various illustrative logical blocks, configurations, modules, and method steps or instructions described in connection with the aspects disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the present disclosure.

The various illustrative logical blocks, configurations, modules, and method steps or instructions described in connection with the aspects disclosed herein, or certain aspects or portions thereof, may be embodied in the form of computer executable instructions (i.e., program code) stored on a computer-readable storage medium which instructions, when executed by a machine, such as a computing device, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The description of the aspects is provided to enable the making or use of the aspects. Various modifications to these aspects will be readily apparent, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed:

1. A computing device comprising a processing unit, a memory, and an exFAT file system executing on the processing unit, the file system when executing on the processing unit performing operations comprising:
   receiving, by the file system, a request to perform a file operation on a file, the request indicating the file is to be encrypted;
   prepending, by the file system in response to the request, a header to the file;
   padding, by the file system, the contents of the file to align with a block size upon which an encryption algorithm operates;
   encrypting, by the file system using the encryption algorithm, the contents of the file and writing the encrypted contents into the file after the header;
   storing, by the file system, within the header, encryption metadata relating to the encrypted file;
   indicating, by the file system, in a field of an exFAT FILE directory entry for the file, that the file is encrypted; and
   storing, by the file system, in a field of an exFAT STREAM directory entry for the file, an indication of an amount of the padding.

2. The computing device recited in claim 1, the file system appending an additional file name extension to a file name of the encrypted file to further indicate the file is encrypted.

3. The computing device recited in claim 1, the field of the exFAT FILE directory entry comprising a Reserved0 field, and the file system setting a single bit of the Reserved0 field to indicate that the file is encrypted.

4. The computing device recited in claim 1, the field of the exFAT STREAM directory entry comprising an EfsTailByteCount field defined in a reserved portion of the STREAM directory entry.

5. The computing device recited in claim 1, the file system further storing in another field of the exFAT STREAM directory entry for the file, an indication of a length of the prepended header.

6. The computing device recited in claim 5, the another field of the exFAT STREAM directory entry comprising an EfsHeaderLength field defined in a reserved portion of the STREAM directory entry.

7. The computing device recited in claim 1, in which the file system also stores in the prepended header at least one of (a) an indication of a true size of the encrypted file or (b) the indication of the amount of the padding.

8. The computing device recited in claim 1, in which the file system further performs operations comprising:
   moving the encrypted file from a first directory to a second directory by:
      allocating new FILE and STREAM directory entries for the file in the second directory;
      reading the contents of the FILE and STREAM directory entries for the file from the first directory;
      writing the contents to the new FILE and STREAM directory entries of the second directory; and
      indicating that the FILE and STREAM directory entries of the first directory are unused.

9. A method of providing native file encryption support in an exFAT file system of a computing device, the method comprising:
   receiving, by the file system, a request to perform a file operation on a file, the request indicating the file is to be encrypted;
   prepending, by the file system in response to the request, a header to the file;
   padding, by the file system, the contents of the file to align with a block size upon which an encryption algorithm operates;
   encrypting, by the file system using the encryption algorithm, the contents of the file and writing the encrypted contents into the file after the header;
   storing, by the file system, within the header, encryption metadata relating to the encrypted file;
   indicating, by the file system, in a field of an exFAT FILE directory entry for the file, that the file is encrypted; and
   storing, by the file system, in a field of an exFAT STREAM directory entry for the file, an indication of an amount of the padding.

10. The method recited in claim 9, further comprising appending an additional file name extension to a file name of the encrypted file to further indicate the file is encrypted.

11. The method recited in claim 9, the field of the exFAT FILE directory entry comprising a Reserved® field, and indicating that the file is encrypted comprising setting a single bit of the Reserved® field.

12. The method recited in claim 9, the field of the exFAT STREAM directory entry comprising an EfsTailByteCount field defined in a reserved portion of the STREAM directory entry.

13. The method recited in claim 9, further comprising storing in another field of the exFAT STREAM directory entry for the file, an indication of a length of the prepended header.

14. The method recited in claim 13, the another field of the exFAT STREAM directory entry comprising an EfsHeaderLength field defined in a reserved portion of the STREAM directory entry.

15. The method recited in claim 9, further comprising storing in the prepended header at least one of (a) an indication of a true size of the encrypted file or (b) the indication of the amount of the padding.

16. The method recited in claim 9, further comprising:
moving the encrypted file from a first directory to a second directory by:
allocating new FILE and STREAM directory entries for the file in the second directory;
reading the contents of the FILE and STREAM directory entries for the file from the first directory;
writing the contents to the new FILE and STREAM directory entries of the second directory; and
indicating that the FILE and STREAM directory entries of the first directory are unused.

17. A method comprising:
receiving, by a file system of a computing device, a request to perform a file access operation on a file;
determining, from a field of a directory entry associated with the file, that the file is encrypted;
obtaining, from a header prepended to the file, encryption metadata associated with the encrypted file; and
decrypting, using at least a portion of the obtained encryption metadata, contents of the encrypted file following the prepended header.

18. The method recited in claim 17, the directory entry associated with the file comprising an exFAT FILE directory entry, and determining that the file is encrypted comprising reading a bit of a Reserved® field of the exFAT FILE directory entry.

19. The method recited in claim 17, further comprising:
determining, from information in a field of an exFAT STREAM directory entry associated with the file, an amount of padding added to the file in connection with encryption of the file; and
reporting, based on determining the amount of padding, a true size of the unencrypted data file as the file size.

20. The method recited in claim 17, further comprising:
hiding, based on the determining that the file is encrypted, an additional file name extension of the file.

* * * * *